W. H. Wall.
Rein and Bridle.
No. 90,139. Patented May 18, 1869.
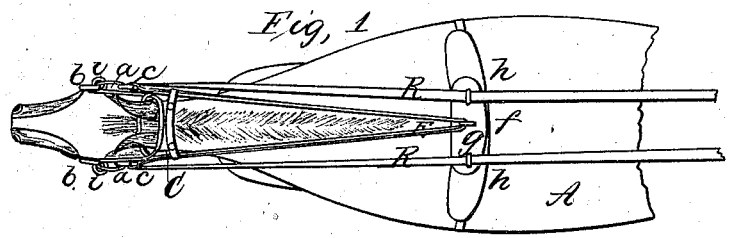
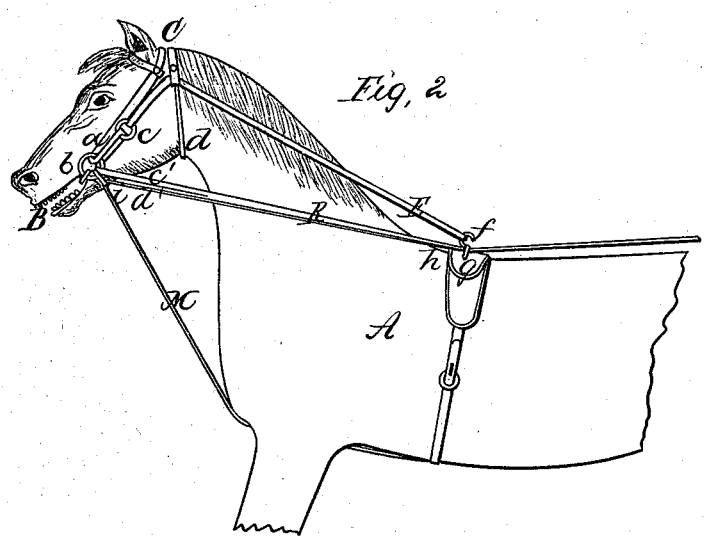
Witnesses,
S. N. Piper.
J. P. Snow.
Inventor,
William H. Wall.
by his attorney
R. H. Eddy

WILLIAM H. WALL, OF BOSTON, MASSACHUSETTS.

Letters Patent No. 90,139, dated May 18, 1869.

---

IMPROVED DRIVING-REIN AND BRIDLE.

---

The Schedule referred to in these Letters Patent and making part of the same.

---

*To all persons to whom these presents may come:*

Be it known that I, WILLIAM H. WALL, of Boston, of the county of Suffolk, and State of Massachusetts, have invented a new and useful Improvement in Driving-Reins and Bridles; and do hereby declare the same to be fully described in the following specification, and represented in the accompanying drawings, of which—

Figure 1 is a top view, and

Figure 2 a side elevation of my invention, as applied to a horse.

In the said drawings—

A denotes a horse, or that portion thereof to which my improved bridle is applied.

B represents the bit, arranged in the usual manner in the mouth of the animal.

The headstall is shown at C, the throat-latch, or fastening-strap thereof being represented at d.

In carrying out my invention, I run each cheek-strap a through one of the rings b of the bit, and connect such strap with one of two branches c' d' of one of the driving-reins R R, the other branch also going through the bit-ring, or a hanger, i, therefrom, and being fixed to one of the branches of a standing martingale, M.

Furthermore, the connected rein-branch and cheek-piece of each side of the bridle may also be rove through an eye, c, affixed to one end of the check-rein E, in which case the purchase of the reins on the bit will be greatly increased.

From the above, it will be seen that each driving-rein is provided with two branches, c' d', one of which is connected with the martingale, and the other with the cheek-piece of the headstall, and that both of the branches are rove through the bit-ring, or one goes through it, and the other through a ring, or hanger dependent from it.

The check-rein is to be hitched, in the usual manner, in a water-hook, f, of the saddle g of the harness, and each of the driving-reins may go through a D, or guide, h, projecting from such saddle.

On drawing back the driving-reins, the head of the animal will not only be drawn downward, with a purchase on the martingale, the check-rein, and the headstall, but the bit, at the same time, will be drawn upward into the mouth.

My invention will operate to great advantage in controlling an unruly horse.

What I claim as my invention, is—

1. The combination of the driving-reins, headstall, and bit, substantially in manner as described, each driving-rein, under such mode of combining the parts, being made with two branches connected to the martingale and cheek-pieces of the headstall, and applied to one of the rings of the bit, substantially as and so as to operate therewith, as described.

2. And, in combination therewith, the application of one of the branches, each, of the driving-reins to the check-rein, substantially in manner, and so as to operate therewith, as hereinbefore explained.

WM. H. WALL.

Witnesses:
R. H. EDDY,
SAMUEL N. PIPER.